Feb. 23, 1971     R. L. TYGH, JR     3,564,824
ROTARY MOWER BLADE
Filed May 5, 1969
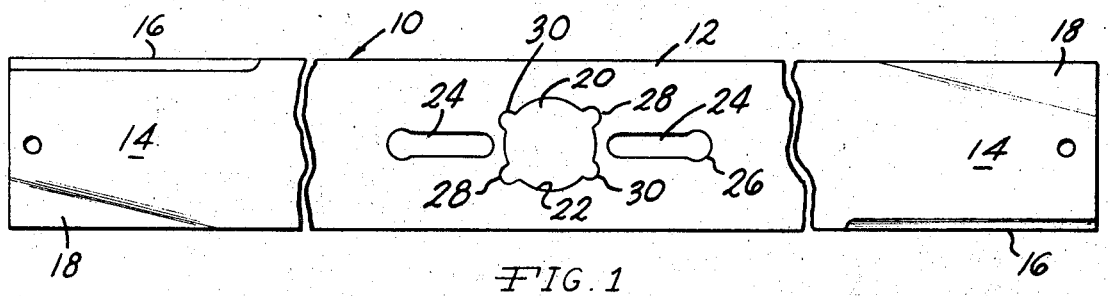
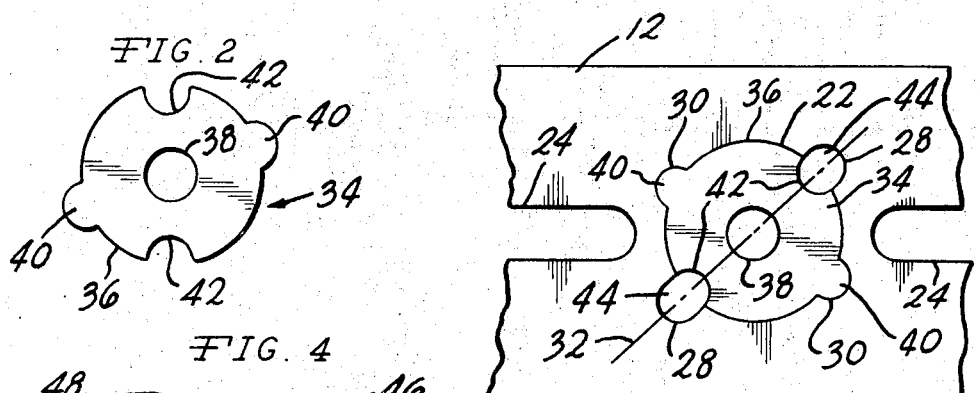
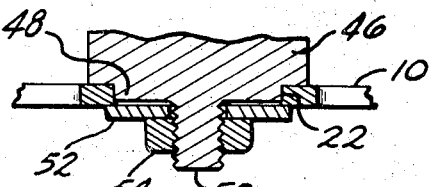
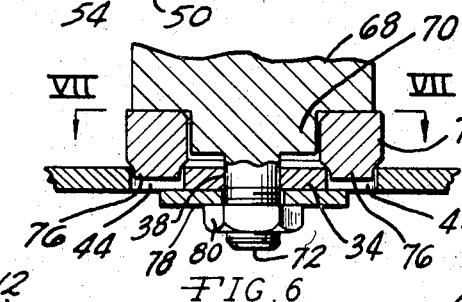
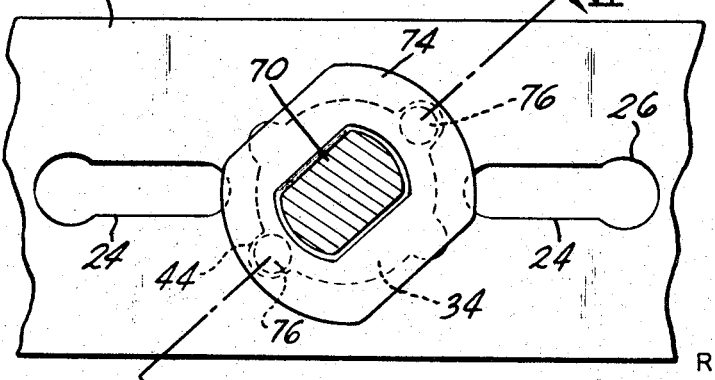
INVENTOR
ROBERT L. TYGH JR.
BY *Beaman & Beaman*
ATTORNEYS United States Patent Office 3,564,824
Patented Feb. 23, 1971

3,564,824
ROTARY MOWER BLADE
Robert L. Tygh, Jr., Jackson, Mich., assignor to Michigan Production Grinding Co., Clark Lake, Mich., a corporation of Michigan
Filed May 5, 1969, Ser. No. 821,704
Int. Cl. A01d 55/18
U.S. Cl. 56—295    6 Claims

ABSTRACT OF THE DISCLOSURE

A rotary mower blade that is universally usable with all types of rotary mowers wherein the central region of the blade includes a circular hole which may receive an adapter having a smaller hole located therein. The blade includes slots and notches for permitting the blade to be mounted upon blade shafts utilizing this type of connection feature, and notches are also defined in the periphery of the hole defined in the blade central region, and in the adapter periphery, for the accommodation of rotary mowers utilizing pins spaced closer to the axis of the blade rotation than permits reception into the blade slots.

BACKGROUND OF THE INVENTION

The invention pertains to the field of rotary lawn mower blades, and is particularly directed to the configuration of the blade at which the blade is affixed to the blade shaft.

Many different makes and models of rotary lawn mowers are presently available, and no standardization has taken place with respect to the means for mounting the blades to the blade shaft, or other mower mechanism for rotating the blade. Thus, when the lawn mower owner finds it necessary to replace the blade that was originally furnished with his mower, he often is required to find a dealer handling his particular type of mower. This necessity to purchase replacement blades from only specified sources is troublesome, and as rotary lawn mower blades often require replacement due to damage, the "after" or "replacement" market for rotary lawn mower blades is rather extensive. Rotary lawn mower blades are often sold in hardware stores, and other similar types of retail outlets, but to provide a complete service it is necessary that a very large inventory be maintained on hand in view of the various types of mounting configurations, and the average hardware store is not able to keep on hand every type of mower blade, but will limit his inventory to the most popular types of blades.

While it is common practice to form both circular holes and radially extending slots in mower blades in order to permit various types of mowers to be used with a given blade, the mounting devices used by several mower manufacturers depart from the use of such holes or slots, and to the applicant's knowledge there has not been a lawn mower blade previously available which could be considered truly "universal" with respect to most rotary lawn mowers manufactured and distributed in the United States.

SUMMARY OF THE INVENTION

It is a purpose of the invention to provide a system for holding rotary lawn mower blades to the blade shaft structure whereby a single construction of lawn mower blade may be used with all types of rotary lawn mowers presently being distributed in the United States.

In the practice of the invention the lawn mower blade includes a central region in which a circular hole is defined. A pair of diametrically related slots are formed in the blade's central region on opposite sides of the hole. Additionally, notches are defined in the periphery of the hole, and an adapter may be used with the blade for insertion into the hole in the event the blade shaft requires a smaller diameter than that of the hole formed in the blade. Thus, the blade permits usage with blade shafts of various diameters, and the utilization of the slots and notches also permits the blade to be used with those blade-mounting structures incorporating pins or protuberances radially spaced from the axis of blade rotation which are inserted into the slots or notches of the blade.

The adapter which is received within the blade opening also includes a pair of protuberances adapted to be received within recesses defined in the blade central region intersecting the hole thereof wherein rotation of the adapter relative to the hole is prevented. Additionally, the adapter is notched at peripheral locations which align with notches defined in the blade central region wherein the notches of the blade and adapter define openings for receiving pins extending from the blade-mounting structure of the mower which are located relatively close to the axis of blade rotation, and cannot be received within the slots.

BRIEF DESCRIPTION OF THE DRAWINGS

The above objects of the invention will be appreciated from the following description and accompanying drawings wherein:

FIG. 1 is a plan view of a rotary lawn mower blade constructed in accord with the invention, FIG. 2 is a plan view of the adapter used with the blade holding system of the invention, FIG. 3 is a plan, enlarged, detail view of the adapter located within the blade hole, FIG. 4 is an enlarged, detail, diametrical, sectional view of the blade of the invention utilized with a blade shaft having a large diameter blade-mounting boss, FIG. 5 is an enlarged, diametrical, sectional, detail view of the blade of the invention utilized with a blade shaft structure employing a small diameter shaft and a pair of blade-engaging pins placed a significant distance from the axis of blade rotation, FIG. 6 is an enlarged, detail, diametrical, sectional view of the blade of the invention utilized with a blade mount incorporating a small diameter threaded stud, and blade-engaging pins located relatively close to the blade axis of rotation as taken along section VI—VI of FIG. 7, and FIG. 7 is a plan view of the assembly of FIG. 6 taken along section VII—VII thereof.

DESCRIPTION OF THE PREFERRED EMBODIMENT

A blade for a rotary lawn mower which is of a typical construction in accord with the invention is illustrated in FIG. 1. Of course, it will be appreciated that the general configurations of rotary lawn mower blades vary considerably, and the blade-holding means of the invention can be utilized with all types of blade configurations. In the disclosed embodiment the blade 10 includes a central region 12 and end regions 14 upon which the cutting edges 16 are defined, and the trailing edges thereof are upturned at 18 to function as air deflection means for drawing air into the blade housing in the conventional manner.

The central region of the blade 10 is preferably formed of a sheet or plate planar configuration and includes a circular hole 20 defined by an inner surface periphery 22. The axis of the hole 20 constitutes the axis of blade rotation. A pair of slots 24 are defined in the blade upon opposite sides of the axis of blade rotation and extend in the general longitudinal direction of the blade. The longitudinal axes of the slots coincide, and pass through the axis of blade rotation. The slots 24 may be defined with an enlarged circular portion at 26 for cooperation with mowers having pins of this diameter at this location. The width of the slots 24 is such as to receive mower blade mounting pins located at various radial dimensions from the axis of blade rotation.

The hole 20 defined in the central region 12 is of a circular configuration and includes a pair of notches 28 defined therein, the notches being disposed in diametrically opposed relationship to each other with respect to the axis of the hole. Additionally, a pair of recesses 30 are defined in the central region 12 intersecting the periphery of the hole 20, and the recesses are also located in diametrically opposed relationship to each other with respect to the hole axis. In the case with both the notches 28 and the recesss 30, a line connecting the center of the recesss and notches, respectively, passes through the axis of the hole 20. Additionally, it will be noted that such a line, as represented at 32, FIG. 3, with respect to the notches 28, is obliquely related to the longitudinal length of the blade.

The adapter which may be used with the blade of the invention is illustrated in FIG. 2. The adapter 34 is formed of a sheet material such as steel, having a thickness substantially equal to that of the blade and includes an outer circular periphery 36 having a diameter only slightly less than the diameter of the blade hole 20. Centrally, the adapter 34 is provided with a hole 38 which will be of a standard size such as ⅜", or ⁵⁄₁₆", and adapters having different sized holes will be stocked by the blade seller. The adapter 34 includes a pair of diametrically opposed protuberances or ears 40 which are of a configuration complementary to the recesses 30 for being closely received therein, and thereby preventing rotation of the adapter relative to the blade upon being received within the hole 20. Additionally, a pair of notches 42 are defined in the adapter intersecting the periphery thereof in diametrically opposed relation upon the adapter, and the notches 42 are so located as to align with the notches 28 upon the adapter being received within the hole 20 to define holes 44 as will be appreciated in FIG. 3.

FIGS. 4 through 7 illustrate three of the several typical blade mounting installations capable of being utilized with the mower blade of the invention.

In FIG. 4 a blade shaft 46 is illustrated having a lower end including a circular boss 48 of a diameter only slightly less than that of the diameter of the hole 20. In practice, the hole 20 will be 1¼" in diameter. The boss 48 is of an axial length less than the thickness of the blade central region 12, and a centrally defined threaded stud 50 is formed thereon. Upon inserting the circular boss 48 into the hole 20 the blade is properly centered upon the shaft 46, and a pressure washer 52 bearing upon the underside of the blade, held in place by a nut 54, completes the installation. In this mode of installation the adapter 34 is not utilized.

FIG. 5 illustrates another type of blade mounting for the blade wherein the blade mounting structure includes a shaft 56 having a threaded end 58 upon which the pressure washer 60 and the nut 62 are mounted. The shaft 56 extends through a drive member 64 which includes radially extending portions having circular pins or knobs 66 extending downwardly for reception within the slots 24. In that the threaded portion 58 is of a reduced dimension with respect to the hole 20 the adapter 34 is inserted in the hole 20 as in FIG. 3 when used with the type of installation of FIG. 5. The threaded end portion 58 extends through the adapter hole 38 and the diameter of the pressure washer 60 is greater than that of the diameter of the adapter wherein tightening of the nut 62 will maintain the assembly as illustrated in FIG. 5. The reception of the pins 66 within the slots 24 assures a positive driving connection between the driver 64 and the blade 10, and the close reception between the shaft portion 58 and the adapter hole 38 assures that the blade will be concentrically located upon the shaft.

Another mode of installation is illustrated in FIGS. 6 and 7 wherein the blade may be used with mowers having drive pins rather closely related to the axis of blade rotation. This type of connection is used by rotary lawn mowers produced by the Modern Tool and Die Company of Cleveland, Ohio. In this mode of assembly the blade shaft 68 includes a generally rectangular configuration 70 adjacent its lower end from which extends the threaded stud 72. The rectangular portion 70 is surrounded by a driver member 74 having a central opening of a generally rectangular configuration for closely cooperating with the shaft portion 70, and the driver includes a pair of pins 76 which are received within the holes 44 defined by the notches 28 and 42 formed in the central blade portion 12 and the adapter. The reception of the pins 76 in the holes 44 produces a positive driving connection between the blade shaft 68 and the blade, and upon placing the pressure washer 78 and the nut 80 upon the threaded stud 72 the entire assembly may be maintained firmly upon the drive shaft. In that the threaded stud 72 is closely received within the adapter hole 38 the blade will be concentrically located upon the blade shaft.

Upon inserting the adapter 34 into the hole 20 such that the ears 40 are received within the recesses 30 the notches 42 will align with the notches 28 as in FIG. 3. In this manner insertion of the adapter into the hole assures proper assembly and alignment of the notches. Additionally, the use of the ears 40 and the recesses 30 prevents rotation of the adapter within the hole 20, and as much of the frictional engagement between the pressure washers and the blade will occur in the region of the adapter, when the adapter is used, the fact that the adapter does not rotate relative to the blade increases the frictional driving connection between the blade shaft and the blade in those modes of assembly wherein driving pins are not mounted upon drivers, and the adapter is employed. Preferably, the notches 28 and 42 are of a configuration constituting a little more than a semicircle. Thus the holes 44 will have a somewhat oval shape which will allow for tolerances in the dimension of the pins 76 and permit easy assembly of the blade upon the mower shaft structure.

It is to be appreciated that various modifications to the inventive concept may be apparent to those skilled in the art without departing from the spirit and scope thereof, and it is intended that the invention be defined only by the scope of the following claims.

What is claimed is:

1. A universal blade holding system for rotary lawn mowers comprising, in combination, a blade body of plate material having a central region and cutting regions radially spaced from said central region, said central region having a circular hole centrally defined therein defined by a circular peripheral surface having an axis, a pair of elongated slots defined in said central region on opposite sides of said hole, said slots each having a longitudinal axis, said longitudinal axes coinciding and intersecting the axis of said hole, a pair of notches defined in said central region intersecting said hole peripheral surface, said notches being diametrically related to each other with respect to said hole, an adapter adapted to be located within said hole, said adapter having a circular periphery of a diameter slightly less than that of said hole circular peripheral surface, an opening centrally defined in said adapter, and mutually engaging keying means defined on said adapter and blade body preventing relative rotative movement between said adapter and blade body when said adapter is within said hole.

2. A universal blade holding system for rotary lawn mowers as in claim 1 wherein said notches are so located upon said body member that a line connecting the center of said notches passes through said hole axis and said line is obliquely related to said longitudinal axes of said slots.

3. A universal blade holding system for rotary lawn mowers as in claim 1 wherein said keying means includes a protuberance defined on said adapter periphery and a recess defined in said blade body central region intersecting said hole peripheral surface, said protuberance being received within said recess upon said adapter being received within said hole.

4. A universal blade holding system for rotary lawn mowers as in claim 3 wherein a pair of recesses are defined in said central region intersecting said peripheral surface, said recesses being diametrically related to each other with respect to the hole axis, and a pair of protuberances defined on said adapter periphery in diametric relation to each other received within said recesses.

5. In a universal blade holding system for rotary lawn mowers as in claim 1 wherein a pair of notches are defined in the periphery of said adapter in diametrically opposed relation and are aligned with said central region notches whereby upon the adapter being located in said hole the notches of said central region and adapter define a pair of openings at diametrically opposed locations relative to said hole axis.

6. In a universal blade holding system for rotary lawn mowers as in claim 4 wherein a pair of notches are defined in the periphery of said adapter in diametrically opposed relation and are aligned with said central region notches whereby upon the adapter being located in said hole the notches of said central region and adapter define a pair of openings at diametrically opposed locations relative to said hole axis.

References Cited
UNITED STATES PATENTS

| | | | |
|---|---|---|---|
| 1,491,874 | 5/1924 | Martell | 287—53 |
| 3,044,241 | 7/1962 | Snider | 56—295 |
| 3,050,925 | 8/1962 | West et al. | 56—295 |
| 3,144,258 | 8/1964 | Ottosen et al. | 56—25.4X |
| 3,157,978 | 11/1964 | McMullen | 56—295 |
| 3,327,460 | 6/1967 | Blackstone | 56—295 |
| 3,388,540 | 6/1968 | Michaud | 56—295 |
| 3,430,461 | 3/1969 | Boylan | 56—295X |

LOUIS G. MANCENE, Primary Examiner

J. A. OLIFF, Assistant Examiner